United States Patent [19]
Giannini

[11] Patent Number: 5,407,294
[45] Date of Patent: Apr. 18, 1995

[54] ENCODER MOUNTING DEVICE

[75] Inventor: Phillip Giannini, Somerset, N.J.

[73] Assignee: Daido Corporation, Somerset, N.J.

[21] Appl. No.: 54,689

[22] Filed: Apr. 29, 1993

[51] Int. Cl.⁶ .......................... F16D 1/00; G01D 5/34
[52] U.S. Cl. .................................. 403/337; 403/405.1; 250/231.13
[58] Field of Search ............... 403/23, 24, 337, 405.1; 250/231.13, 231.14, 231.15, 231.16, 231.17, 231.18

[56] References Cited

U.S. PATENT DOCUMENTS

| | | | |
|---|---|---|---|
| 1,396,979 | 11/1921 | Thomas | 403/337 |
| 3,076,959 | 2/1963 | Pong | 250/231.13 |
| 3,470,385 | 9/1969 | Emmerich | 250/231.14 |
| 3,770,971 | 11/1973 | Somerset | 250/231.16 |
| 3,894,232 | 7/1975 | Laspesa | 250/231.14 |
| 4,121,532 | 10/1978 | Coryell, III | 403/337 |
| 4,246,478 | 1/1981 | Nishiyama et al. | 250/231.13 |
| 4,841,297 | 6/1989 | Bourgeaux et al. | 250/231.15 |
| 5,181,750 | 1/1993 | Reum | 285/38 |

Primary Examiner—Richard A. Bertsch
Assistant Examiner—Howard R. Richman
Attorney, Agent, or Firm—Kane, Dalsimer, Sullivan, Kurucz, Levy, Eisele and Richard

[57] ABSTRACT

An encoder mounting device is used for mounting an encoder to the shaft of an apparatus so that the encoder can sense and monitor the rotation of the shaft. The device includes a collar and a plastic ring arranged and designed to prevent metal contact between the encoder and the apparatus. In this manner the mounting device prevents electrical and thermal conduction therebetween.

12 Claims, 2 Drawing Sheets

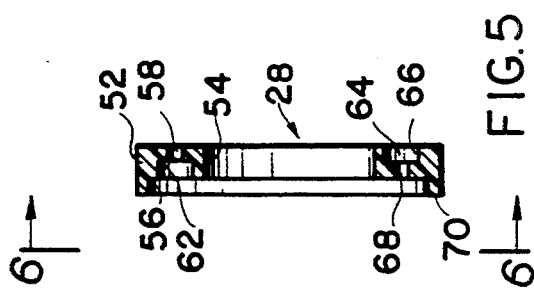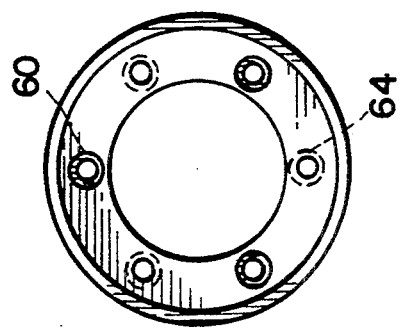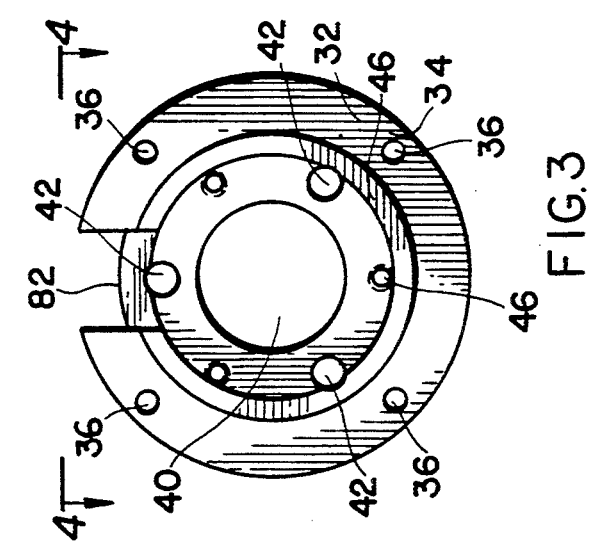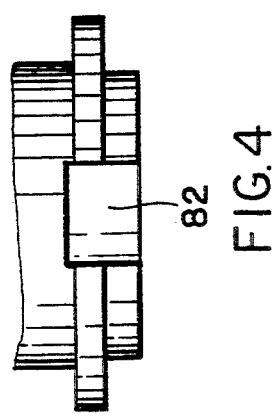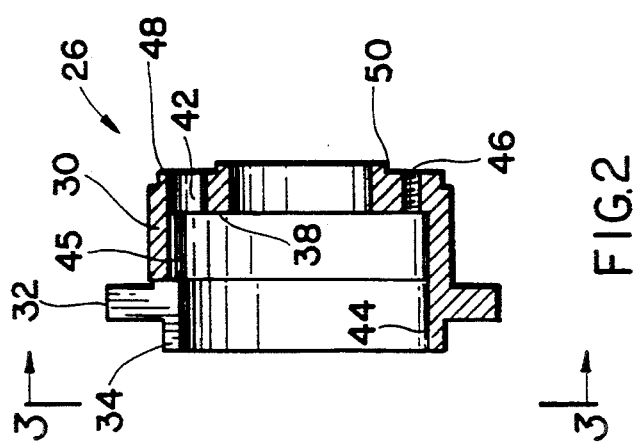

ENCODER MOUNTING DEVICE

BACKGROUND OF THE INVENTION

1. Field of Invention

This invention pertains to a mounting device for a rotary encoder, and more particularly to a mechanical interface between a rotating apparatus such as an electric motor and the like, and an electronic device used for accurately monitoring rotation.

2. Description of the Prior Art

It is frequently necessary to monitor the rotation of various equipment such as electric motors, generators, and so forth. It has been found that this monitoring is best accomplished by providing an electronic device known as an encoder which is mechanically coupled to a rotating shaft of the monitored device and which senses the angular movement of the shaft. Usually the encoder is mounted on the monitored equipment by a solid metallic mounting member having either a tubular or square shape with a central opening. A flexible coupling disposed in the central opening is used to connect the shaft to the encoder.

A by-product of rotational equipment especially if the equipment has a large power output, is the production of intense spurious electro-magnetic fields (or EMF). Additional ground current loops are also formed, especially if the equipment constitutes or includes induction or brushless AC/DC motors. Equipment including AC/DC motors with brushes may also produce high frequency noise signals. These spurious signals are readily transmitted to the encoder through the mounting member. However, since the encoder utilizes digital electronic circuits, it is particularly susceptible to spurious signals because they may cause the encoder to malfunction and burn out.

In addition, the monitored equipment frequently is operating at elevated temperatures. For example, some electric motors may be operating at over 100° C. However, the digital circuitry of the encoder has a lower operating temperature range. As a result, heat is transmitted to the encoder through the mounting member which may also cause it to malfunction.

Thus, there is a need for a novel mounting means for mounting an encoder to the rotating member of an apparatus, which mounting means holds the encoder firmly and securely and at the same time protects the encoder from undesirable electrical signals or heat from the monitored apparatus.

OBJECTIVES AND SUMMARY OF THE INVENTION

In view of the above-mentioned, it is an objective of the present invention to provide a mounting device for an encoder which device can protect the encoder from spurious electrical signals.

A further objective is to provide a device which can protect the encoder from undesirable heat.

Yet another objective is to provide a mounting device which is relatively inexpensive and is easy to make.

Other objectives and advantages of the invention shall become apparent from the following description. A mounting device constructed in accordance with this invention consists of a collar made of a relatively strong and light material such as aluminum or an aluminum alloy. The collar has one end constructed and arranged for mounting on an apparatus to be monitored such as an electric motor or generator. The subject mounting device further includes a ring mounted on another end of the collar and made of a plastic material having a thickness and composition selected for electrical and thermally isolation of the encoder.

BRIEF DESCRIPTION OF THE DRAWINGS

FIG. 2 shows a side sectional view of a collar of the device of FIG. 1;

FIG. 3 is an end view of the collar of FIG. 2;

FIG. 4 shows a partial top view of the collar of FIGS. 2 and 3;

FIG. 5 shows a side-sectional view of an isolating ring of the device of FIG. 1; and FIG. 6 shows an end view of the ring of FIG. 5.

DETAILED DESCRIPTION OF THE INVENTION

Figure 1:
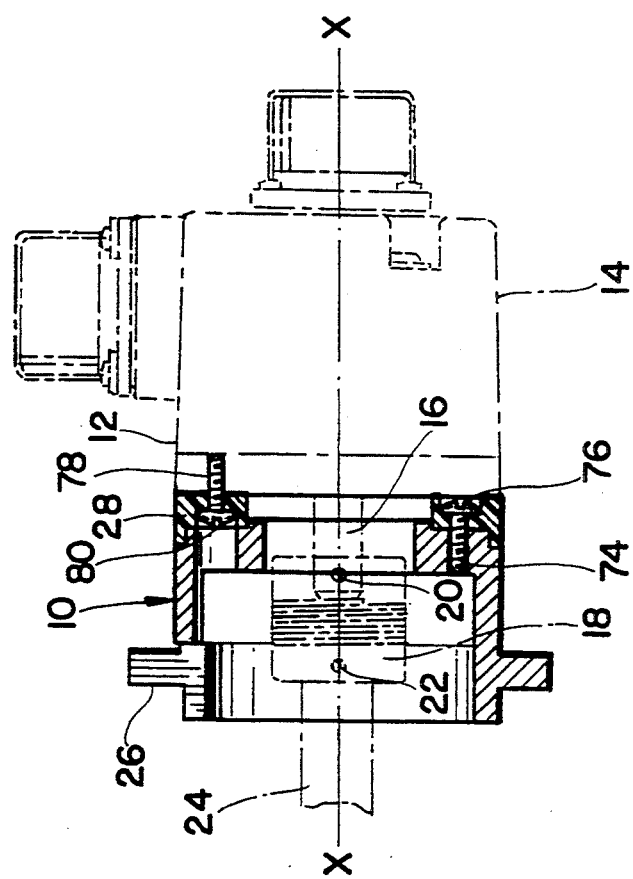
FIG. 1 shows a side view-sectional view of a mounting device constructed in accordance with this invention and mounted on an encoder.

Referring now to the Figures, in FIG. 1, a mounting device 10 is shown secured to an encoder 12. Encoder 12 includes a housing 14 with an extruding shaft 16. Mounted on shaft 16 is a flexible coupling 18 secured to shaft 16 by a set screw 20. A second set screw 22 is used to engage the shaft 24 of a monitored equipment (not shown). Thus, shaft 24 is rotationally engaged to shaft 16 by coupling 18. The rotation of shafts 16, 20 is sensed by electronic circuitry disposed inside housing 14.

Mounting device 10 consists of a collar 26 and an insulating ring 28. Details of collar 26 are shown in FIGS. 2, 3 and 4. Collar 26 consists of a cylindrical portion 30 having at one axial end an annular flange 32. Beyond flange 32, portion 30 is terminated with an annular lip 34 having a radial thickness smaller than the radial thickness of portion 30 itself. Flange 32 is formed with a plurality of holes 36 extending in parallel with the longitudinal axis X—X of device 10.

At the end opposite lip 34, collar 26 is provided with an annular wall 38 extending radially inwardly from portion 30 as shown. Wall 38 has a central circular opening 40 for the shaft 16 and coupling 18. Wall 38 is further provided with three relatively large holes 42 preferably disposed at an angle of about 120° from each other. Preferably adjacent to these holes 42, the inner surface 44 of portion 30 is provided with arcuate groves 45 to allow an elongated tool such as a screw driver to be inserted into the collar and holes 42 as described below.

Additionally, wall 38 is provided with three more holes 46 interspace with holes 42. Holes 46 are smaller than holes 42 and are internally threaded. On outer surface 48, wall 38 is provided with an annular shoulder 50.

Collar 26 is made of a strong but light material such as aluminum or an aluminum alloy.

Referring now to FIGS. 5 and 6, insulating ring 28 has an outer surface 52, an inner surface 54 and two side faces 56, 58. Outer surface 52 has approximately the same diameter as annular portion 30 of collar 26. Similarly surface 54 has approximately the same diameter as central opening 40. In this manner when collar 26 and ring 28 are placed next to each other in an axially abutting relationship as shown in FIG. 1, they form a continuous body for the mounting device.

Ring 28 is provided with two sets of holes extending between faces 56 and 58. One set of holes 60 is chamfered from surface 56 inward by a cylindrical wall 62. This cylindrical wall 62 has at least the same diameter as holes 42 in wall 38. The second set of holes 64 in ring 28 is chamfered by inner walls 66 leaving a hole 68 slightly larger than holes 46 in wall 38. Ring 28 is also provided with an annular lip 70 extending axially away from surface 56.

Ring 28 is made of a plastic material which is a good electrical and thermal insulator. One such material is for example, a glass reinforced dielectric phenolic material such as ULTEM®, a polyetherimide resin available from Westlake Plastics Company of Lenni, Pa. 19052. The inventor has found that a ring made of this material having an overall thickness of about 10 cm provides good thermal and electric insulation for the encoder and is sufficiently strong mechanically for mounting purposes. Other similar plastic materials may also be suitable.

In order to assemble the mounting device 10, ring 28 is first placed on the wall 38. Lip 70 is sized to fit over the shoulder 50 as shown in FIG. 1 with the ring 28 fitting snugly on the collar 26. The two components are then secured together by screws 74 passing through holes 64 and engaging the threads in holes 46. Importantly the screws 74 are sized to fit within the wall 66 of holes 64 so that their heads 76 are fully imbedded inside the holes 64. Once mounting device is assembled, it is then attached to the encoder 12 by screws 78 inserted through holes 42 into holes 62. Once again the screws 78 are sized so that their heads 80 are fully imbedded within holes 42 and do not protrude into or touch any part of collar 26.

The mounting device 10 and the encoder 12 attached thereto can now be attached to a monitored device through the collar 26. For example, the mounting device 10 may be attached by screws (not shown) passing through holes 36 in flange 32. Alternatively, the flange 36 maybe secured to the monitored apparatus by clips (not shown). In the drawings, the collar 10 is shown with a square cut-out 82 formed in the portion 30, flange 32 and rim 34. As the device 10 is mounted on the monitored apparatus, its shaft 24 is simultaneously inserted into the flexible coupling 18. After device 10 is mounted, a screwdriver may be used to tighten set screw 22 through cut-out 82 to secure shaft 24 to the coupling 18.

In this manner the mounting device 10 is used to secure the encoder 12 to a monitored equipment. Importantly, because of the shape of the holes 60, 64 and screws 74, 78, there is no metal-to-metal contact between the collar 26 and encoder 12 and accordingly the mounting device 10 blocks any spurious electrical signals, including high frequency signals, EMF and ground loops from the monitored equipment from the encoder 12. Additionally, because its structure and arrangement, the ring on the mounting device further insures that the encoder is thermally insulated from the collar and hence will remain substantially unaffected by the temperature of the monitored apparatus. In addition, the collar forms a protective sleeve about the coupling 18 thereby insuring that the coupling remains free of oil, dirt or other foreign matter.

In the Figures the ring is shown disposed between the collar and the encoder. However, the mounting device may also be constructed so that the ring is disposed between the collar and the monitored apparatus.

Obviously, numerous other modifications may be made to this invention without departing from its scope as defined in the appended claims.

I claim:

1. An encoder mounting device for mounting an encoder on a rotating apparatus, said device comprising:
   a metal collar means;
   an insulating ring, one of said collar and insulating ring having rotating apparatus mounting means for mounting said device on said rotating apparatus and encoder securing means for securing said encoder to said device; and
   ring securing means for securing said insulating ring to said collar, said ring securing means being constructed and arranged to prevent metal contact from said collar to said encoder.

2. The device of claim 1 wherein said collar includes collar securing means for securing said collar to said rotating apparatus and said ring includes ring securing means for securing said ring to said encoder.

3. The device of claim 1 wherein said ring is made of a material having thermoinsulating and electroinsulating properties.

4. The device of claim 1 wherein said ring is made of a polyetherimide resin.

5. A device for mounting an encoder on a rotating apparatus, said device comprising;
   a cylindrical collar;
   a ring attached to said cylindrical collar;
   apparatus securing means for securing one of said ring and collar to said rotating apparatus; and
   encoder securing means for securing the other of said ring and collar to said encoder;
   wherein said collar and ring are constructed and arranged to prevent thermal and electric conduction between said apparatus rotating and said encoder.

6. The device of claim 5 said wherein said ring is formed with a first set of holes, said device further comprising a first set of screws disposed in said first set of holes for attaching said ring to said collar.

7. The device of claim 6 wherein said first set of screws are constructed and arranged to prevent metal contact between said screws and one of said rotating apparatus and said encoder.

8. The device of claim 6 wherein said ring is provided with a second set of holes and a second set of screws disposed in said second set of holes for attaching said ring to said encoder.

9. The device of claim 8 wherein said second set of screws is arranged and constructed to prevent metal contact between said second set of screws and said collar.

10. The device of claim 5 wherein said collar is made of a metallic material.

11. The device of claim 5 wherein said ring is made of a plastic material.

12. The device of claim 5 wherein said ring is made of a material having thermoinsulating and electroinsulating properties.

* * * * *